(12) United States Patent
Yang et al.

(10) Patent No.: US 10,567,240 B2
(45) Date of Patent: Feb. 18, 2020

(54) MULTIMEDIA RESOURCE DISTRIBUTION METHOD, APPARATUS AND SYSTEM

(71) Applicant: Tencent Technology (Shenzhen) Company Limited, Shenzhen (CN)

(72) Inventors: Yang Yang, Shenzhen (CN); Liqiang Xie, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 481 days.

(21) Appl. No.: 15/184,801

(22) Filed: Jun. 16, 2016

(65) Prior Publication Data
US 2016/0301578 A1 Oct. 13, 2016

Related U.S. Application Data

(63) Continuation of application No. PCT/CN2014/095218, filed on Dec. 27, 2014.

(30) Foreign Application Priority Data

Jan. 3, 2014 (CN) .......................... 2014 1 0003487

(51) Int. Cl.
*H04L 12/24* (2006.01)
*H04L 12/26* (2006.01)
(Continued)

(52) U.S. Cl.
CPC ...... *H04L 41/5003* (2013.01); *H04L 41/5019* (2013.01); *H04L 43/08* (2013.01); *H04L 67/10* (2013.01); *H04N 21/23106* (2013.01)

(58) Field of Classification Search
CPC . H04L 41/5003; H04L 41/5019; H04L 43/08; H04L 67/10; H04N 21/2181;
(Continued)

(56) References Cited

U.S. PATENT DOCUMENTS 5,467,087 A * 11/1995 Chu .................... H03M 7/3086
341/51
7,130,913 B2 * 10/2006 Fallon .................. H04N 9/8042
709/231
(Continued)

FOREIGN PATENT DOCUMENTS

CN 101453404 A 6/2009
CN 101917391 A 12/2010
(Continued)

OTHER PUBLICATIONS

Tencent Technology, ISRWO, PCT/CN2014/095218, dated Mar. 31, 2015, 7 pgs.
(Continued)

*Primary Examiner* — Vivek Srivastava
*Assistant Examiner* — Binod J Kunwar
(74) *Attorney, Agent, or Firm* — Morgan, Lewis & Bockius LLP (57) ABSTRACT

Method and device of increasing downloading speed in a network are disclosed. The method includes: a server receiving a download request from a first client device, the download request identifying a first compressible resource; obtaining a network quality assessment score of the first client device, the network quality assessment score indicating a projected download speed of the first client device; in accordance with the network quality assessment score, determining a first compression level of the first compressible resource for the first client device; searching for the first compressible resource at the determined first compression level locally at the first server; and sending a request for at least one of the one or more second segments that are not pre-stored locally at the first server to a second server of the network.

17 Claims, 6 Drawing Sheets

(51) Int. Cl.
*H04L 29/08* (2006.01)
*H04N 21/231* (2011.01)

(58) Field of Classification Search
CPC .. H04N 21/23106; H04N 21/00; H04N 21/20;
H04N 21/23; H04N 21/24; H04N
21/2402; H04N 21/2662
USPC ......................................................... 709/224
See application file for complete search history.

(56) References Cited

U.S. PATENT DOCUMENTS

| | | | | |
|---|---|---|---|---|
| 7,386,046 | B2* | 6/2008 | Fallon | H03M 7/30 375/240 |
| 7,715,475 | B1* | 5/2010 | Puri | H04N 19/70 375/240 |
| 8,427,346 | B2* | 4/2013 | Potkonjak | H03M 7/30 341/50 |
| 8,706,727 | B2* | 4/2014 | Yang | G06F 17/30312 707/736 |
| 9,137,550 | B1* | 9/2015 | Velummylum | G06F 16/9574 |
| 9,304,823 | B2* | 4/2016 | Gupta | H04L 67/06 |
| 9,363,339 | B2* | 6/2016 | Bhaskar | H03M 7/3088 |
| 9,843,802 | B1* | 12/2017 | Wallace | H04N 19/10 |
| 2002/0047899 | A1 | 4/2002 | Son et al. | |
| 2005/0188112 | A1* | 8/2005 | Desai | H04L 47/10 709/247 |
| 2007/0053428 | A1* | 3/2007 | Saleem | H04N 19/0009 375/240 |
| 2007/0285417 | A1* | 12/2007 | Prokopenko | G06T 15/405 345/419 |
| 2009/0100195 | A1* | 4/2009 | Barsness | G06F 11/1464 709/247 |
| 2009/0122870 | A1* | 5/2009 | Sadowski | H04N 19/176 375/240.24 |
| 2009/0200228 | A1* | 8/2009 | Eisengraber-Pabst | B01D 29/111 210/493.5 |
| 2010/0306373 | A1* | 12/2010 | Wormley | H04L 67/1029 709/224 |
| 2011/0296046 | A1* | 12/2011 | Arya | H04L 65/602 709/231 |
| 2013/0019029 | A1* | 1/2013 | Jagmohan | H03M 7/3068 709/247 |
| 2013/0167181 | A1* | 6/2013 | Dixit | H04N 21/6131 725/95 |
| 2013/0311671 | A1* | 11/2013 | Luo | H04L 12/4633 709/233 |
| 2014/0006538 | A1* | 1/2014 | Oikonomou | H04L 67/2847 709/213 |
| 2014/0006643 | A1* | 1/2014 | Ur | H04L 69/04 709/247 |
| 2014/0070966 | A1* | 3/2014 | Fablet | H03M 7/3086 341/55 |
| 2016/0072911 | A1* | 3/2016 | Velummylum | G06F 16/9574 709/224 |
| 2016/0127238 | A1* | 5/2016 | McCollum | H04L 47/10 709/224 |

FOREIGN PATENT DOCUMENTS

| | | | |
|---|---|---|---|
| CN | 101977234 | A | 2/2011 |
| CN | 102123303 | A * | 7/2011 |
| CN | 102123303 | A * | 7/2011 |
| CN | 102123303 | A | 7/2011 |
| CN | 102378152 | A | 3/2012 |
| CN | 102404204 | A | 4/2012 |
| CN | 103248695 | A * | 8/2013 |
| CN | 103248695 | A * | 8/2013 |
| CN | 103248695 | A | 8/2013 |

OTHER PUBLICATIONS

Tencent Technology, IPRP, PCT/CN2014/095218, dated Jul. 5, 2016, 5 pgs.

* cited by examiner

MULTIMEDIA RESOURCE DISTRIBUTION METHOD, APPARATUS AND SYSTEM

PRIORITY CLAIM AND RELATED APPLICATION

This application is a continuation application of PCT Patent Application No. PCT/CN2014/095218, entitled "MULTIMEDIA RESOURCE DISTRIBUTION METHOD, APPARATUS AND SYSTEM" filed on Dec. 27, 2014, which claims priority to Chinese Patent Application No. 201410003487.9, entitled "MULTIMEDIA RESOURCE DISTRIBUTION METHOD, APPARATUS AND SYSTEM" filed on Jan. 3, 2014, both of which are incorporated by reference in their entirety.

FIELD OF THE TECHNOLOGY

The present disclosure relates to the field of browser technologies, and in particular, to a multimedia resource distribution method, apparatus and system.

BACKGROUND

Existing multimedia resource distribution (such as, video on demand, audio on demand, and picture sharing) usually use multi-level cache mechanisms, such as a content delivery network (CDN), and peer to server & peer (P2SP). A terminal may download data from a cache node, thereby accelerating the data downloading speed.

In order to achieve best user experience, content providers often compress multimedia resource so that the downloading is faster. However, users usually have very different network qualities and downloading bandwidth. The existing multimedia resource distribution mechanisms cannot compress multimedia resources according to actual network conditions of users. As a result, either users with high network quality receive resource with mediocre quality or users with low network quality cannot smoothly download what they need. Therefore, it is desirable to have a method that enables users to automatically download resources with sizes fitting their network qualities.

SUMMARY

Figure 1:
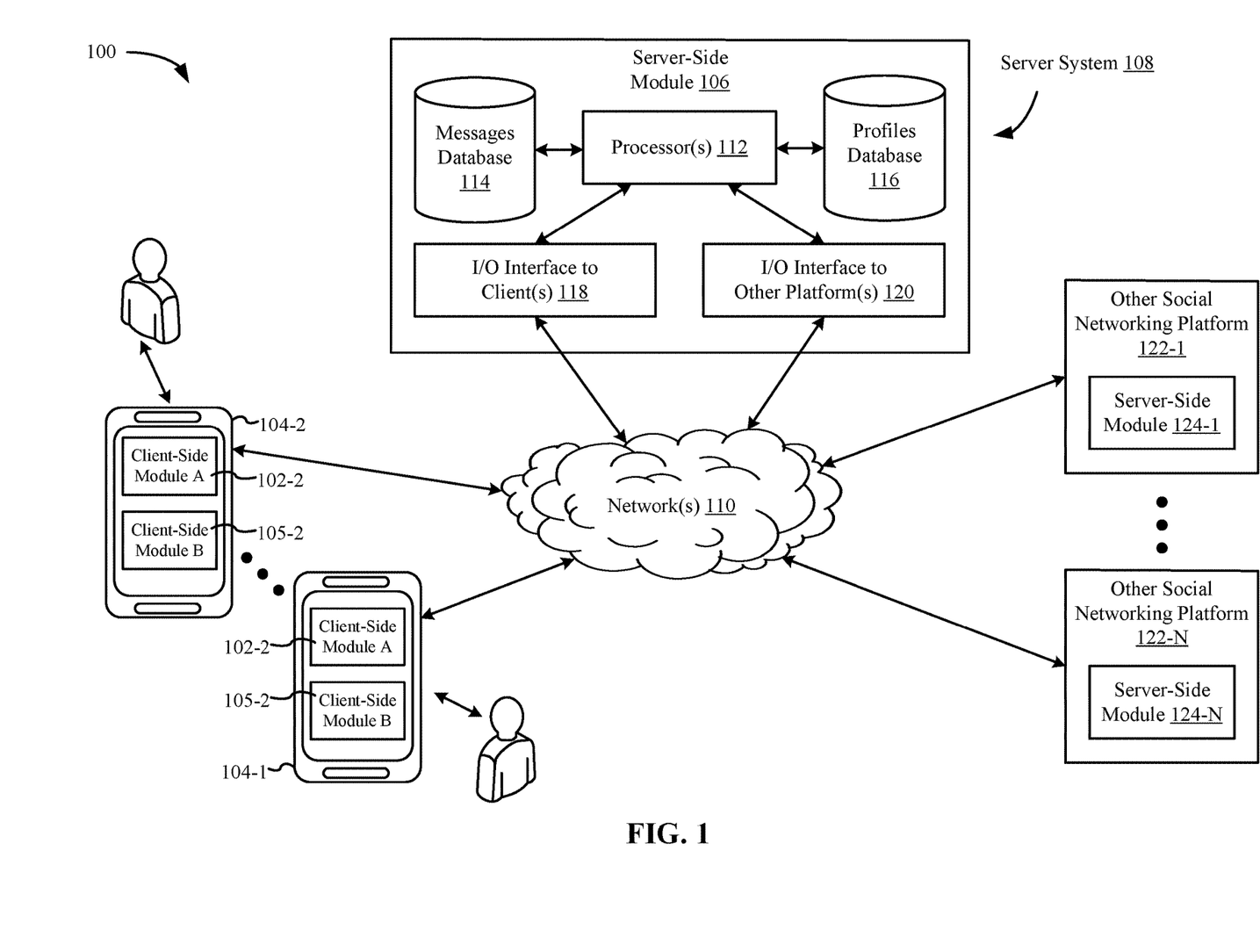
FIG. 1 is a block diagram of a server-client environment in accordance with some embodiments.

In accordance with some implementations of the disclosed technology, a method of increasing downloading speed in a network is disclosed. The method comprises: a server (e.g., server system 108, FIG. 1, server system 320, FIG. 3 and computer 600, FIG. 6) receiving a download request from a first client device (e.g., client device 104, FIG. 1, terminal node 310, FIG. 3), the download request identifying a first compressible resource to be downloaded by the first client device; obtaining a network quality assessment score of the first client device, the network quality assessment score indicating a projected download speed of the first client device; in accordance with the network quality assessment score, determining a first compression level of the first compressible resource for the first client device; searching for the first compressible resource at the determined first compression level locally at the first server; and in accordance with a determination that one or more first segments of the first compressible resource at the determined compression level are pre-stored locally at the first server: sending the locally pre-stored first segments of the first compressible resource at the determined first compression level to the first client device; and in accordance with a determination that one or more second segments of the first compressible resource at the determined compression level are not pre-stored locally at the first server: sending a request for at least one of the one or more second segments that are not pre-stored locally at the first server to a second server of the network.

In some embodiments, a computer system (e.g., server system 108, FIG. 1, server system 320, FIG. 3 and computer 600, FIG. 6) includes one or more processors and memory storing one or more programs for execution by the one or more processors, the one or more programs include instructions for performing, or controlling performance of, the operations of any of the methods described herein. In some embodiments, a non-transitory computer readable storage medium storing one or more programs, the one or more programs comprising instructions, which, when executed by a computer system (e.g., server system 108, FIG. 1, server system 320, FIG. 3 and computer 600, FIG. 6) with one or more processors, cause the computer system to perform, or control performance of, the operations of any of the methods described herein. In some embodiments, a computer system (e.g., server system 108, FIG. 1, server system 320, FIG. 3 and computer 600, FIG. 6) includes means for performing, or controlling performance of, the operations of any of the methods described herein.

Various advantages of the present application are apparent in light of the descriptions below.

BRIEF DESCRIPTION OF THE DRAWINGS

The aforementioned features and advantages of the application as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

Figure 2:
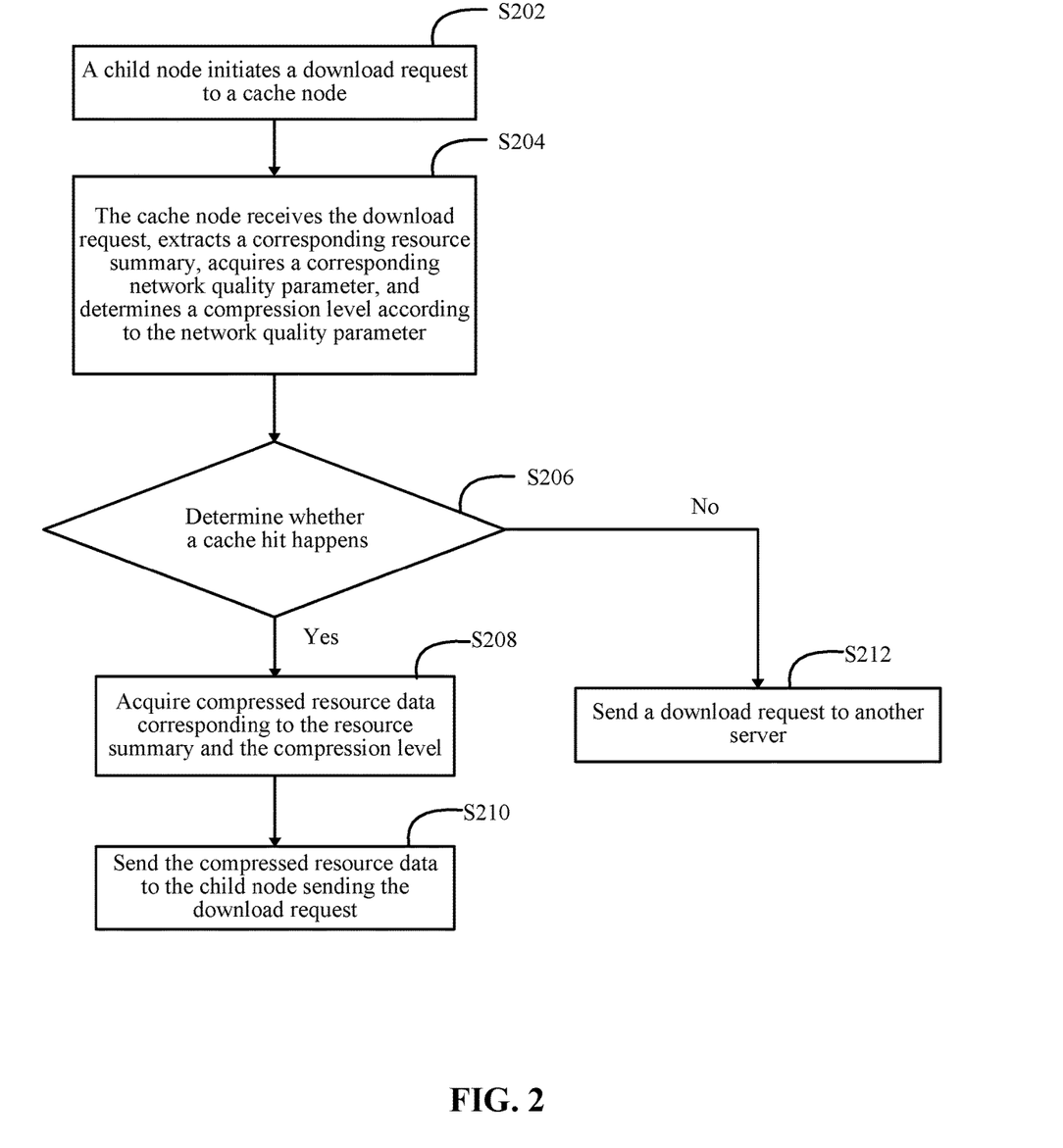
FIG. 2 is a flowchart of a multimedia resource distribution method in accordance with some embodiments.

FIG. 2 is a flowchart of a multimedia resource distribution method in accordance with some embodiments. In some embodiments, multimedia resources include audio resources, video resources or picture resources, and may be applied to application scenarios such as audio/video on demand and picture sharing. In some embodiments, the method can be performed at a network illustrated in FIG. 3.

Figure 3:
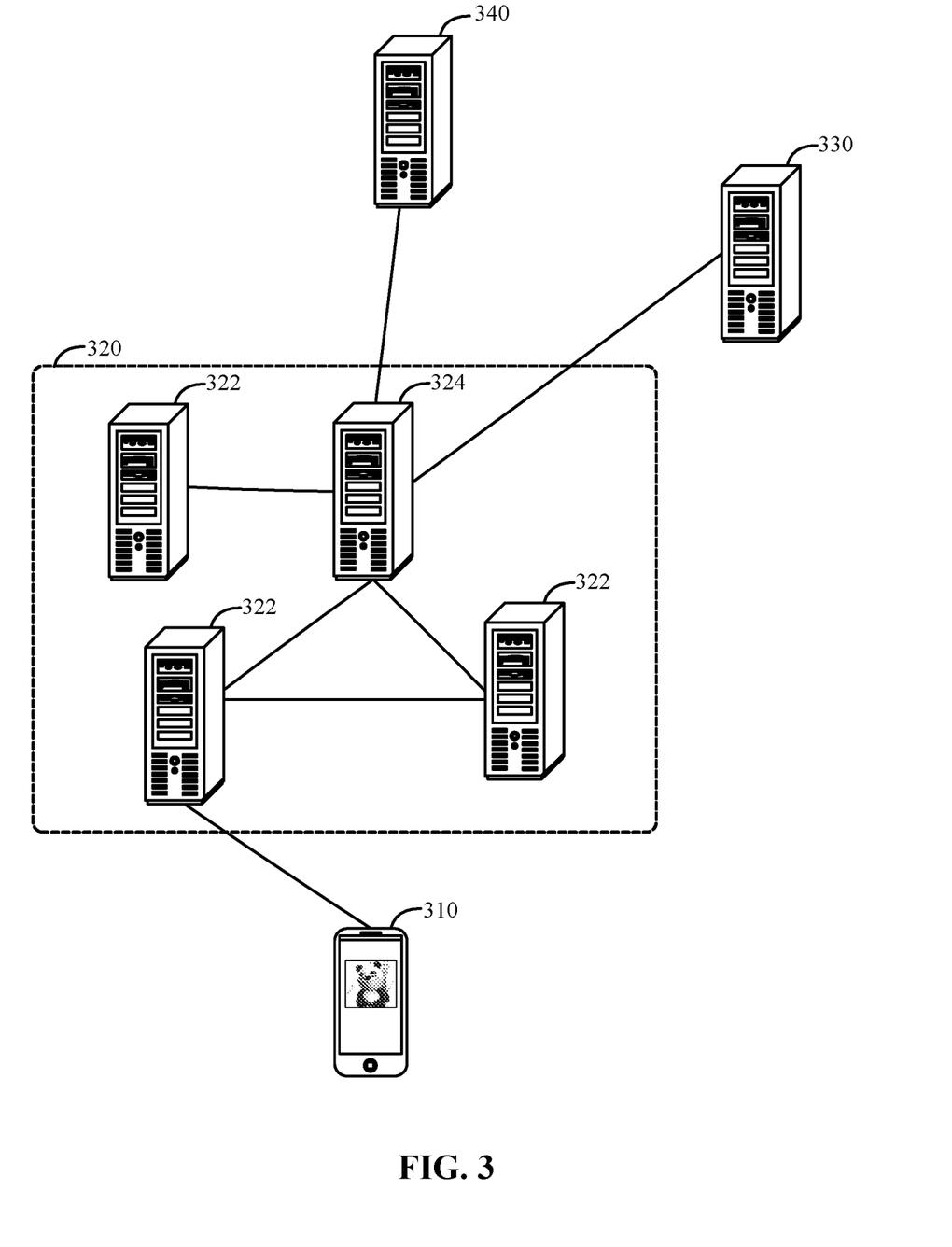
FIG. 3 is a schematic view of a topological structure of a multimedia resource distribution system in accordance with some embodiments.

FIG. 3 illustrates an example of a network in accordance with some embodiments. A terminal node (client device) 310 is connected to a cache node 320, and the cache node 320 is connected to a storage node 330. The terminal node 310 may request data from the cache node 320, and the cache node 320 may request data from the storage node 330 and then forward the data to the terminal node 310. The terminal node 310 is a child node of the cache node 320 and correspondingly, the cache node 320 is a parent node of the terminal node 310. The cache node 320 is a child node of the storage node 330 (correspondingly, the storage node 330 is a parent node of the cache node 320). In some embodiments, the cache node 320 may be a CDN node, a P2SP node, or another server node that plays a role of cache acceleration.

Further, as shown in FIG. 3, the cache node 320 may be divided into an ordinary node 322 and a super node 324 that are interconnected. The ordinary node 322 and the super node 324 consist of a two-layer structure: the ordinary node 322 is a child node of the super node 24, and the super node 324 is a parent node of the ordinary node 322. The cache node 320 may even comprise a multiple-to-one or multiple-to-multiple connection structure. The ordinary node 322 is connected to the terminal node 310; the super node 324 is connected to the storage node 330, and is a child node of the storage node 330. In some embodiments, the cache node 320 contains multiple levels, such as a first-level node, a second-level node, and an n-level node.

In some embodiments, as shown in FIG. 2, the multimedia resource distribution method may include the following steps.

Step S202: a child node initiates a download request to a cache node. In some embodiments, the child node is a terminal node, which is a client device.

Step S204: the cache node receives the download request, extracts a corresponding resource summary, acquires a corresponding network quality parameter, and determines a compression level according to the network quality parameter.

For example, if a user demands audio/video data on the terminal node 310, the terminal node 310 may initiate a download request to the ordinary node 322 to request the demanded data, and the data is downloaded locally and then played.

In another application scenario, the child node is the ordinary node 322, the parent node is the super node 324, and the method is run on the super node 324. The ordinary node 322 may also send or forward a download request to the super node 324 to request data, and forward the received data to the terminal node 310.

The resource summary is identification information corresponding to data required by the download request, which may be file names, MD5 codes or other file hash values of the data required by the download request.

In an application scenario, the terminal node 310 may request a picture from the cache node 320, and a resource summary of the picture is contained in the download request. In another application scenario, a link address to be accessed may be extracted from the download request, and then a resource summary corresponding to the link address is queried on a resource server. For example, the terminal node 310 is trying to download a music document and provides the download link in the download request.

In some embodiments, the network quality parameter may include one of a bandwidth, a downloading speed, an operator type, a link type, a regional position and a speed test result. The server at the cached node 320 then calculates a network quality assessment score in accordance with the network quality parameter, the score projecting a download speed of the terminal node 310.

In some embodiments, the operator type parameter is the type of an operator of a network used by a terminal node corresponding to the download request, which, for example, may include AT&T, T-Mobile, Verizon, and so on.

In some embodiments, the client device runs a speed test periodically or when the network has changed, and provides the speed test result to the cache node.

In some embodiments, The link type parameter is the type of a link layer protocol of the network used by the terminal node corresponding to the download request, which, for example, may be divided into 2G (for example, General Packet Radio Service (GPRS) technologies), 3G (for example, High-Speed Packet Access (HSPA) technologies), 4G (for example, Frequency Division Duplexing-Long Term Evolution (FDD-LTE) technologies), Wi-Fi and the like.

In some embodiments, the regional position is where the terminal node is located, and may be obtained according to an IP address. For example, the number of the province or municipality where the terminal node is located can be obtained according to an IP address.

In some embodiments, determining a compression level includes acquiring a preset mapping table between network quality parameters and compression levels, and searching for a corresponding compression level in the mapping table according to the extracted network quality parameter. When downloading speed is not directly available, the server may determine a compression level based on other parameters and the mapping table. The table below shows a mapping relationship between network quality parameters and compression levels in accordance with some embodiments.

| Compression levels | Set of conditions of network quality parameters |
| --- | --- |
| 100 | The whole country + Telecom + Wi-Fi or Chicago + Verizon + 3G or . . . |
| 50 | Illinois + Mobile + 3G or Delaware + Verizon + Wi-Fi or . . . |
| 40 | . . . |
| 30 | . . . |
| 20 | Alaska + all operators + 2G or Arizona + Verizon + 3G or . . . |

Determining the compression level in a manner of looking up a mapping table can make the cache node consume a less amount of calculation in the process of determining the compression level, thereby increasing the execution speed.

Step S206: the cache node server determines whether a cache hit happens, and if yes, performs step S208. A cache hit means that one or more first segments of the first compressible resource at the determined compression level are pre-stored locally at the cache node server.

In some embodiments, determining whether a cache hit happens specifically include: acquiring an original segment identifier, generating a compressed segment identifier according to the original segment identifier and the compression level, and determining whether the cache has the compressed resource data corresponding to the compressed segment identifier.

For multimedia type data, a corresponding multimedia file may be divided into multiple resource segments, and each resource segment has a corresponding original segment identifier. For example, for a 3mb (3072 kb) mp3 file, a resource summary thereof is ba3c5galdhaushexiah, and if it is divided into resource segments in a unit of 4 kb, the mp3 file may be divided into 768 resource segments. Correspondingly, original segment identifiers corresponding to the 768 resource segments may be:

```
ba3c5gaklhaushexiah@00001;
ba3c5gaklhaushexiah@00002;
ba3c5gaklhaushexiah@00003;
...
ba3c5gaklhaushexiah@00768.
```

In other words, in accordance with some embodiments, the original segment identifiers may be generated in a form of "resource summary+separator (e.g., @)+resource segment label)."

For example, "ba3c5gaklhaushexiah@00412" represents the 412th resource segment of the MP3 file, and the offset of the resource segment in the entire mp3 file is in the position of 412×4 kb=1648 kb.

In some embodiments, the resource summary may be uploaded to a global resource server to query an original segment identifier corresponding to the resource summary.

In some embodiments, after the original segment identifiers are acquired, compressed segment identifiers may also be generated in a form of "original segment identifier+separator (for example, $)+compression level."

For example, if the corresponding compression level obtained according to the download request requesting the mp3 file is 40, the generated compressed segment identifiers are:

```
ba3c5gaklhaushexiah@00001$40;
ba3c5gaklhaushexiah@00002$40;
ba3c5gaklhaushexiah@00003$40;
...
ba3c5gaklhaushexiah@00768$40.
```

In some embodiments, the cache of the cache node may store different cache data of a certain resource segment of a multimedia resource at different compression levels. For example, for the resource segment ba3c5gaklhaushexiah@00412, the cache node may store cache data corresponding to multiple versions at different compression levels, such as:

```
ba3c5gaklhaushexiah@00412$20;
ba3c5gaklhaushexiah@00412$40;
ba3c5gaklhaushexiah@00412$50;
...
```

The cache node may determine whether cache hit occurs, i.e., determine whether a cache has the specific segments at the corresponding compression level.

Step S208: the cache node server acquires compressed resource data corresponding to the resource summary and the compression level.

Step S210: the cache node server sends the compressed resource data to the child node sending the download request.

In some embodiments, the cache node includes an ordinary node and a super node. The step that the cache node determines whether a cache includes: the ordinary node determining whether the cache hit happens locally; if not, the super node receiving the download request forwarded by the ordinary node, and determine whether a cache hit happens at the super node.

In some embodiments, if the download request has a cache miss in the cache node, the super node forwards the download request to a storage node. The storage node extracts the resource summary according to the download request, reads original resource data corresponding to the resource summary, and sends the original resource data to the super node. The super node receives the original resource data, compresses the received original resource data according to the compression level, and sends compressed resource data to the terminal node through the ordinary node.

If the cache miss happens, step S212 is performed. Step S212: the cache node sends a download request to a parent node.

In some embodiments, if multiple compressed segment identifiers corresponding to the resource summary partially hit the cache, the partially hit part may be returned to the child node, and missing compressed segment identifiers or original segment identifiers corresponding thereto are included to the download request, and then the download request is forwarded to a parent node.

For example, if the compression level is 20, the compressed segment identifier of ba3c5gaklhaushexiah@00 (001-00412)$20 hits the cache, and the hit data is sent to a child node, and identifiers from 00413 to 00768 or compressed segment identifiers ending with 00413$20 to 00768$20 are included to the download request forwarded to a parent node.

It should be noted that, if the cache node is the cache node 320, the hit data is sent to the terminal node 310; if the cache node is the super node 324 shown in FIG. 3, the super node 324 may first send the data to the ordinary node 322 which forwards the data to the terminal node 310.

In some embodiments, the cache node server receives original resource data from a storage node, compresses the received original resource data to the compression level, and sends compressed resource to the child node corresponding to the download request.

For example, if the method is run on the super node 324 in FIG. 3, and the cache miss happens, the super node 324 acquires original resource data from the storage node 330. The original resource data is original data of multimedia resources that is uncompressed, such as lossless audio, ultra-clear video or lossless pictures. The super node 324 compresses the original resource data to the corresponding compression level, and sends the compressed resource data to the ordinary node 322, which forwards the compressed resource data to the terminal node 310.

In some embodiments, the cache node server sends the received original resource data and compression level to a compression node, and receives returned compressed resource data from the compression node. For example, the cache node 320 in FIG. 3 may perform a compression task on itself. Alternatively, the data is sent to the compression node 340, which compresses the data and then returns the compressed data to the cache node 320. Because compression of multimedia data needs to consume more CPU resources, performing the task on the separated compression node 340 may reduce the calculation burden of the cache node, thereby improving the execution efficiency. In some embodiments, after receiving the data returned by the parent node thereof, the cache node 320 may locally stores the data. When another terminal node requests the same data, cache hit can be achieved, thereby improving the downloading speed of the terminal node.

Figure 4:
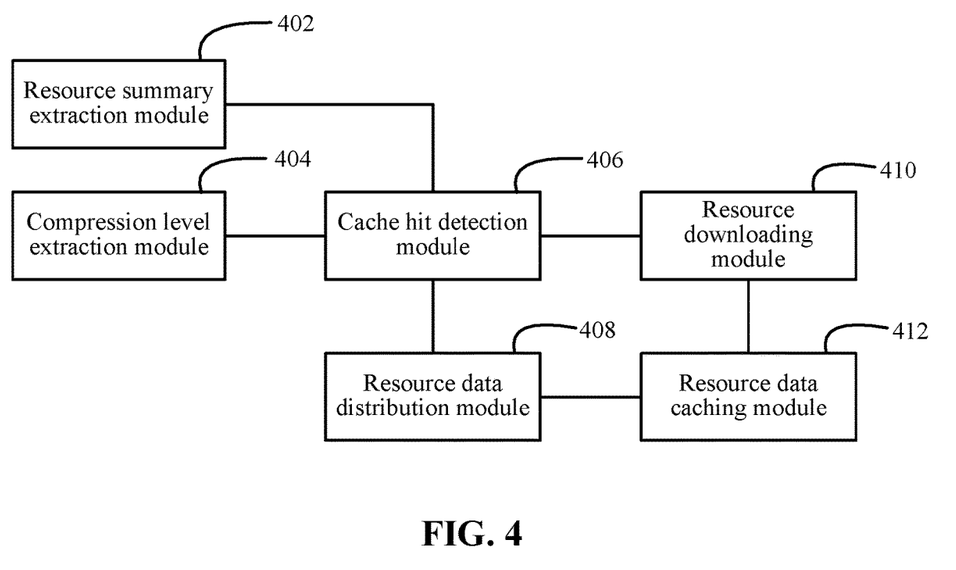
FIG. 4 is a schematic structural view of a multimedia resource distribution apparatus in accordance with some embodiments.

In some embodiments, as shown in FIG. 4, a multimedia resource distribution apparatus includes a resource summary extraction module 402, a compression level extraction module 404, a cache hit detection module 406, a resource data distribution module 408 and a resource downloading module 410.

In accordance with some embodiments, the resource summary extraction module 402 is configured for receiving a download request, and extracting a corresponding resource summary.

In accordance with some embodiments, the compression level extraction module 404 is configured for acquiring corresponding network quality parameters, and determining a compression level according to the network quality parameter.

In accordance with some embodiments, the cache hit detection module 406 is configured for determining whether a cache hit happens and the corresponding compression level.

In accordance with some embodiments, the resource data distribution module 408 is configured for acquiring compressed resource data corresponding to the resource summary and the compression level when the cache hits, and returning the compressed resource data to a child node corresponding to the download request; and In accordance with some embodiments, the resource downloading module 410 is configured for forwarding the download request to a parent node when the cache miss happens.

In some embodiments, the cache hit detection module 406 is further configured for acquiring an original segment identifier corresponding to the resource summary, generating a compressed segment identifier according to the original segment identifier and the compression level, and determining whether the cache has compressed resource data corresponding to the compressed segment identifier.

In accordance with some embodiments, the resource downloading module 410 is further configured for receiving compressed resource data corresponding to the resource summary and the compression level returned by the parent node.

In accordance with some embodiments, the resource downloading module 410 is further configured for receiving original resource data corresponding to the resource summary returned by the parent node, compressing the received original resource data according to the compression level, and generating compressed resource data corresponding to the resource summary and the compression level.

In some embodiments, the resource downloading module 410 is further configured for sending the received original resource data and compression level to a compression node, and receiving the returned compressed resource data corresponding to the resource summary and the compression level.

In some embodiments, the multimedia resource distribution apparatus further includes a resource data caching module 412, for caching the compressed resource data corresponding to the resource summary and the compression level.

In some embodiments, the compression level extraction module 404 is further configured for acquiring a preset mapping table between network quality parameters and compression levels, and searching for a corresponding level in the mapping table.

Figure 5:
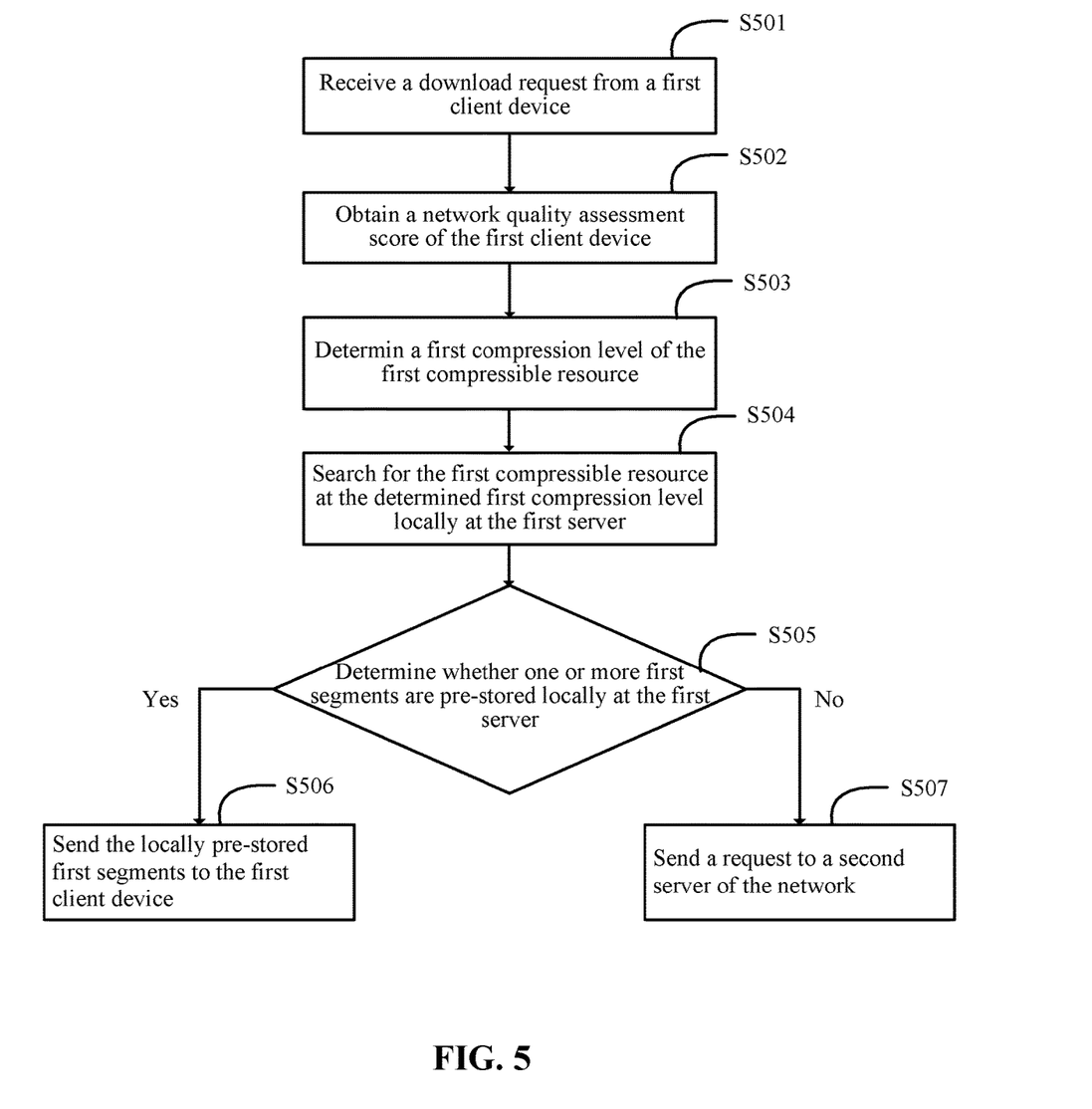
FIG. 5 is a flowchart of a multimedia resource distribution method in accordance with some embodiments.

FIG. 5 is a flowchart of a method of increasing downloading speed in a network in accordance with some embodiments. In some embodiments, the method is performed at a first server of having one or more processors and memory for storing one or more programs to be executed by the one or more processors. The first server can be a server for an ordinary node 322, a super node 324, a storage node 330 or a node in a P2P or P2SP network in accordance with various embodiments.

In accordance with some embodiments, in a step S501, the first server receives a download request from a first client device (e.g., client device 104, FIG. 1, terminal node 310, FIG. 3), the download request identifying a first compressible resource to be downloaded by the first client device. In some embodiments, compressing a document means that a document is reduced in size while being in the same format, to be opened, displayed or performed in the same way to convey substantial the same information to users with the uncompressed document. For example, a photo may be reduced in pixels while keeping the content largely the same. A WAV music document may be compressed to a MP3, WMA, APE, or FLAC format. Videos can be compressed to different 1080p, 720p, 480p, and so on.

In accordance with some embodiments, in a step S502, the first server obtains a network quality assessment score of the first client device, the network quality assessment score indicating a projected download speed of the first client device.

In accordance with some embodiments, the network quality assessment score of the first client device is based on at least a bandwidth test result obtained for the first client device. In some embodiments, the network quality assessment score is calculated in accordance with network quality parameters discussed above.

In accordance with some embodiments, in a step S503, in accordance with the network quality assessment score, the first server determines a first compression level of the first compressible resource for the first client device. In some embodiments, high compression level corresponds to a bigger size of the resource data.

In some embodiments, the determining compression levels are based on a predetermined algorithm. For example, the algorithm may contain a setting that a user should not use more than 3.5 seconds in downloading a picture. The network quality assessment score indicates a projected downloading speed of 0.4M per seconds. The first server calculates that the picture should be no more than a size of 1.4M. The original size of the picture is 3M. The compression level is thus set at 46%. The algorithm can also set a margin of tolerance, for example, plus 5% plus and minus 10%. When the calculated compression level is 46%, a compression level is determined to be within a range of 36% to 51%. Segments with a compression level that is between 36% and 51% are determined to be with the determined compression level and will be sent to the client device.

In some embodiments, the compression levels are quantized into several levels, e.g., 10%, 20%, 30% . . . and 100%. In this case, when the calculated compression level is 46%, the server may choose the highest level that is lower than the calculated compression level, i.e., 40%.

In accordance with some embodiments, the download request is a streaming download request, and determining the compression level of the first compressible resource for the first client device further comprises: selecting an optimal size of the first compressible resource that enables the first compressible resource to be played at the first client device without interruption with a minimum loss of quality caused by compression. In some embodiments, the first server automatically chooses the highest compression level that enables the user to play the compressible resource uninterrupted. For example, the user is listening to music, and the first server selects a compression level so that the bandwidth of his phone is big enough for the download speed required.

In accordance with some embodiments, the first server detects a change of the network quality assessment score of the first client device; and changes the determined first compression level in accordance with the change of the network quality assessment score. For example, a user is listening to music while sitting in a moving car. The network quality changes as the client is moving. The first server then determines a new compression level for the new network quality of the user.

When the determined compression level changes, a new set of segments with new compression level are needed. In accordance with some embodiments, the first server determines, for each remaining segment of the first compressible resource that is not yet downloaded to the first client device, whether the remaining segment is pre-stored locally at the changed first compression level; in accordance with a determination that there is a previously sent request for the remaining segment at the first compression level, abandons the previously sent request for said remaining segment at the first compression level; in accordance with a determination that the remaining segment is pre-stored locally at the first server at the changed first compression level, sends the remaining segment at the changed compression level to the first client device; and in accordance with a determination that the remaining segment is not pre-stored locally at the changed first compression level, sends a request for said remaining segment at the changed first compression level to another server of the network.

In accordance with some embodiments, in a step S504, the first server searches for the first compressible resource at the determined first compression level locally at the first server.

In accordance with some embodiments, in a step S505, the first server determines whether one or more first segments of the first compressible resource at the determined compression level are pre-stored locally at the first server. Note that when the first server pre-stores the first compressible resource but only at a different compression level from the first compression level, it is still a cache miss.

In accordance with some embodiments, in a step S506, in accordance with a determination that one or more first segments of the first compressible resource at the determined compression level are pre-stored locally at the first server, the first server sends the locally pre-stored first segments of the first compressible resource at the determined first compression level to the first client device.

In accordance with some embodiments, in a step S507, in accordance with a determination that one or more second segments of the first compressible resource at the determined compression level are not pre-stored locally at the first server, the first server sends a request for at least one of the one or more second segments that are not pre-stored locally at the first server to a second server of the network. The step S507 may be skipped if all of the segments of the first compressible resource are found on the first server.

In some embodiments, the request is forwarded to another server that is closest to the first server, and that server may continue to forward the request to the next server until a server storing the right segments is found. In other words, the first server is not necessarily able to locate the right server at the beginning.

In accordance with some embodiments, the first server obtains information regarding whether any of one or more second segments are pre-stored locally at the second server; obtains, from the second server, current storage location information of any of the second segments that are not pre-stored locally at the second server; and requests the second server to searching for any of the second segments whose current storage location information is not possessed by the second server. Therefore, when the second server does not possess the storage location information, the second server may query the closest server or a higher level server to conduct the search. In some embodiments, the second server can be located at an ordinary node 322, a super node 324 or a storage node 330.

There are at least two routes to send the one or more segments. First, in accordance with some embodiments, before sending the request for the at least one of the one or more second segments that are not pre-stored locally at the first server to the second server, the first server queries the second server to determine that the at least one of the one or more second segments that are not pre-stored locally at the first server is pre-stored locally at the second server. And upon downloading the at least one of the one or more second segments from the second server, the first server sends the at least one of the one or more second segments to the first client device.

Second, in accordance with some embodiments, sending the request for the at least one of the one or more second segments that are not pre-stored locally at the first server to the second server further comprises: before sending the request for the at least one of the one or more second segments that are not pre-stored locally at the first server to the second server, the first server queries the second server to determine that the at least one of the one or more second segments that are not pre-stored locally at the first server is pre-stored locally at the second server; and sending a request for the second server to send the at least one of the one or more second segments directly to the first client device. Therefore, the first server does not download and forward these segments; rather, the first server asks the second server to send these segments directly to the client device.

In accordance with some embodiments, there is a judgment process on whether the process the one or more segments are sent to the first server first which forwards these segments to the client device or the second server sending these segments to the client device directly. In some embodiments, the judgment is based on a calculation and comparison of a first length of time of the first server downloading and forwarding the segments to the client device and a second length of time of the second server directly sending these segments to the client device. The calculation can be in accordance with the network traffic conditions. The first server chooses the route with the shorter length of time.

In some embodiments, the second server is the storage node 330 as shown in FIG. 3. In accordance with some embodiments the second server stores the first compressible resource in an uncompressed state, and upon receiving the request from the first server for downloading the at least one of the one or more second segments, the second server compresses the at least one segment of the first compressible resource to the first compression level and sends the at least one of the one or more second segments of the first compressible resource at the first compression level to the first server. Note that the second server may receive the downloading request from the first server via other servers.

The first server can not only process requests from client devices, but requests from other servers as well. In accordance with some embodiments, the first server (or the second server) receives a request from a third server of the network for one or more third segments of a second compressible resource, the request specifying a second compression level for the one or more third segments of the second compressible resource; identifies at least one of the one or more third segments pre-stored locally at the first server; and sends the at least one of the one or more third segments of the second compressible resource at the second compression level to the third server. For example, the third server receives a download request from a client device or another server and sends a download request for one or more third segments that are not pre-stored on the third server to the first server.

For some of the third segments that are not pre-stored in the first server, the first server can obtain them and forward them to the third server. In accordance with some embodiments, the first server identifies at least one of the one or more third segments of the second compressible resource that are not pre-stored locally at the first server at the second compression level; locates at least one of the one or more third segments of the second compressible resource that are not pre-stored locally at the first server at the second compression level in one or more other servers and client devices in the network; obtains the at least one of the one or more third segments of the second compressible resource that are not pre-stored locally at the first server at the second compression level from the one or more other servers and client devices in the network; and sends the obtained at least one the one or more third segments of the second compressible resource that are not pre-stored locally at the first server at the second compression level to the first client device.

Sometimes, it is more time efficient for the first server to just send segments with higher compression level than spending time to search and download segments with lower compression level. In accordance with some embodiments, in accordance with a determination that at least one or more fourth segments of the first compressible resource are pre-stored locally at the first server at a current compression level that is higher than the determined first compression level, the first server calculates a first length of time needed to obtain the one or more fourth segments at the determined first compression level and a second length of additional time needed to send the one or more fourth segments at the current compression level rather than the determined first compression level to the first client device; if the first length of time is longer than or equal with the second length of additional time, sends the pre-stored one or more fourth segments at the current compression level to the first client device; and if the first length of time is shorter than the second length of additional time, obtains the one or more fourth segments at the determined first compression level and sending the obtained one or more fourth segments at the determined first compression level to the first client device. For example, when a user is trying to view a photo on his phone, the first server determines that the first compression level should be 50%. However, the first server locally only stores the photo at the compression level of 60%. The photo at 60% compression level take 0.7 second more time to download than the photo at 50% compression level given the network quality of the user phone. However, the first server estimates that searching and downloading the photo at 50% compression level takes 1.1 second more time than using the locally pre-stored photo. Therefore, the first server decides to send the photo at 60% compression level to the user so that the client device obtains the photo with higher quality and in less time.

Figure 6:
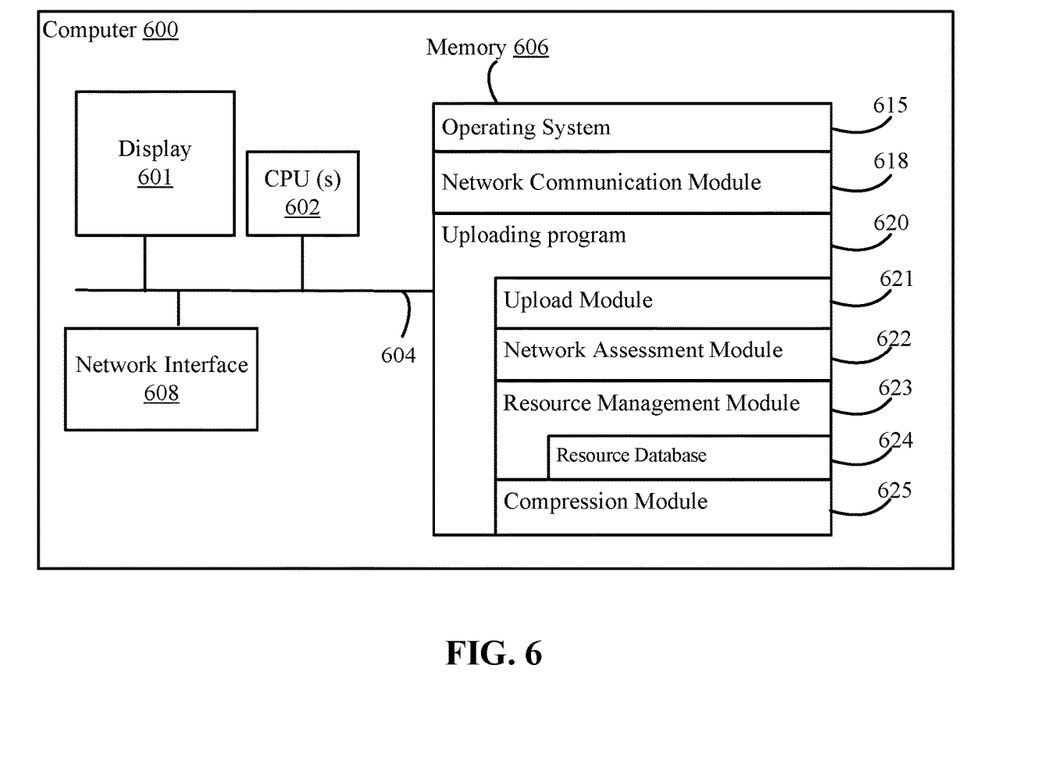
FIG. 6 is a diagram of an example implementation of a server in accordance with some embodiments.

FIG. 6 is a diagram of an example implementation of a server 600 in accordance with some embodiments. The server 600 may serve as the first server, the second server in accompanying text of FIG. 5 or any cache node in a network (e.g., nodes 322, 324, or 330 in FIG. 3). While certain specific features are illustrated, those skilled in the art will appreciate from the present disclosure that various other features have not been illustrated for the sake of brevity and so as not to obscure more pertinent aspects of the implementations disclosed herein. To that end, the server 600 includes one or more processing units (CPU's) 602, one or more network or other communications interfaces 608, a display 601, memory 606, and one or more communication buses 604 for interconnecting these and various other components. The communication buses may include circuitry (sometimes called a chipset) that interconnects and controls communications between system components. The memory 606 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 606 may optionally include one or more storage devices remotely located from the CPU(s) 602. The memory 606, including the non-volatile and volatile memory device(s) within the memory 606, comprises a non-transitory computer readable storage medium.

In some implementations, the memory 606 or the non-transitory computer readable storage medium of the memory 606 stores the following programs, modules and data structures, or a subset thereof including an operating system 616, a network communication module 618, and an uploading program 620.

In accordance with some embodiments, the operating system 616 includes procedures for handling various basic system services and for performing hardware dependent tasks.

In accordance with some embodiments, the network communication module 618 facilitates communication with other devices via the one or more communication network interfaces 608 (wired or wireless) and one or more communication networks, such as the internet, other wide area networks, local area networks, metropolitan area networks, and so on.

In accordance with some embodiments, the uploading program 620 is configured to provide resources to client devices and other servers. In some embodiments, the uploading program 620 comprises an upload module 621, a network assessment module 622, a resource management module 623, and a compression module 625.

In some embodiments, the upload module 621 is configured to receive download requests from client devices and other servers, request and download segments of requested resource from other servers, send segments of resources to client devices and other servers and arrange other servers to send segments of resources.

In some embodiments, the network assessment module 622 is configured to obtain network quality assessment scores of client devices and detecting change of network quality of client devices.

In some embodiments, the resource management module 623 is configured to store resources and storage location information of resources, search resources in the server 600 and other servers and determine what segments, if any, are not locally stored. In some embodiments, the resource management module 623 comprises a resource database which stores resources and storage location information of resources.

In some embodiments, the compression module 625 is configured to determine compression levels of compressible resources for client devices and change desirable compression levels when network quality of client devices change.

Below is an application scenario in accordance with some embodiments. A user in Montana uses a social networking application on a mobile terminal to browse a picture. The original uncompressed data of the picture is stored on the storage node 330 as shown in FIG. 3. And the mobile terminal (the terminal node 310) accesses the Internet using a mobile 2G network of a low-speed operator.

After clicking on a corresponding picture link shared by the friend, the mobile terminal initiates a download request to the ordinary node 322 (the first server). The ordinary node 322 obtains a resource summary of the picture being asij87sd2s81asd8j2, and looks up a mapping table according to the location "Montana", the operator "Mobile" and the link layer protocol type "2G", and estimates a network quality assessment score. In accordance with the network quality assessment score, the first server obtains that a compression level 30. The ordinary node 322 searches locally to find whether compressed segment identifiers starting with "asij87sd2s81sd8j2" and ending with "30" exist. Upon query, the first server finds locally the following resource data corresponding to the compressed segment identifiers:

asij87sd2s81asd8j2@00001$30
asij87sd2s81asd8j2@00002$30
... (consecutive resource segment numbers)...
asij87sd2s81asd8j2@00444$30

The resource data is sent to the mobile terminal, the mobile terminal starts to download the resource data from 00001 to 00444 using the 2G network. The first server also finds that resource data starting from 00445 is missing. The first server forwards the download request to the super node 24 (the second server), and includes a label of "00445-?" in the download request.

The second server receives the download request, and upon searching, obtains the following resource data corresponding to the compressed segment identifiers:

asij87sd2s81asd8j2@00445$30
asij87sd2s81asd8j2@00446$30
... (consecutive resource segment numbers)
asij87sd2s81asd8j2@00976$30

The second server sends the resource data to the first server, which forwards the resource data to the mobile terminal. The second server forwards the download request to the storage node 330, and includes a label of "00977-?" to the download request.

The storage node searches a database or file system for data whose resource summary is asij87sd2s81asd8j2 and resource segment label is greater than or equal to 00977, so as to obtain the following resource data corresponding to the original segment identifiers:

asij87sd2s81asd8j2@00977
asij87sd2s81asd8j2@00978
... (consecutive resource segment numbers)
asij87sd2s81asd8j2@01024

The storage node sends the resource data to the second server, which sends the resource data and the compression level being 30 to the compression node 340. The compression node 340 compresses the data according to the compression level 30, and then returns the compressed data to the second server. As a result, the second server obtains the following resource data corresponding to the original segment identifiers:

asij87sd2s81asd8j2@00977$30
asij87sd2s81asd8j2@00978$30
... (consecutive resource segment numbers)
asij87sd2s81asd8j2@01024$30

The second server locally stores the resource data, and distributes the resource data to the first server. The first server locally stores the resource data after receiving it, and then forwards the resource data to the mobile terminal.

As a result, the client device has downloaded all compressed resource data from asij87sd2s81asd8j2@00001$30 to asij87sd2s81asd8j2@01024$30.

Upon completion of downloading, the mobile terminal loads the data, and the user can browse, in the social networking application of the mobile terminal, the picture shared by the friend that is compressed with the compression level being 30.

While particular embodiments are described above, it will be understood it is not intended to limit the application to these particular embodiments. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the application to the precise forms disclosed. Many modifications and variations are possible in view of the above teachings. The embodiments were chosen and described in order to best explain the principles of the application and its practical applications, to thereby enable others skilled in the art to best utilize the application and various embodiments with various modifications as are suited to the particular use contemplated.

What is claimed is:

1. A method of increasing downloading speed in a network, comprising:

at a first server of the network, wherein the first server has one or more processors and memory for storing one or more programs to be executed by the one or more processors, and the first server is configured to communicate with one or more other servers of the network, including at least a second server that is distinct from the first server:

receiving a download request from a first client device, the download request identifying a first compressible resource to be downloaded by the first client device;

obtaining a network quality assessment score of the first client device, the network quality assessment score indicating a projected download speed of the first client device, and wherein the network quality assessment score is calculated in accordance with an operator type of a network used by the first client device corresponding to the download request, a link type of a link layer protocol of the network used by the first client device, and a regional position where the first client device is located;

in accordance with the network quality assessment score, determining a first compression level of the first compressible resource for the first client device;

searching for the first compressible resource at the determined first compression level locally at the first server;

in accordance with a determination that one or more first segments of the first compressible resource at the first compression level are pre-stored locally at the first server:

sending the locally pre-stored first segments of the first compressible resource at the first compression level to the first client device; and in accordance with a determination that one or more second segments of the first compressible resource at the first compression level are not pre-stored locally at the first server:

sending a request for at least one of the one or more second segments that are not pre-stored locally at the first server to the second server of the network that is distinct from the first server, wherein the first server, before sending the request to the second server, queries the second server to determine that the at least one of the one or more second segments of the first compressible resource at the determined compression level that are not pre-stored locally at the first server is pre-stored locally at the second server.

2. The method of claim 1, further comprising:

before sending the request for the at least one of the one or more second segments that are not pre-stored locally at the first server to the second server, querying the second server to determine that the at least one of the one or more second segments that are not pre-stored locally at the first server is pre-stored locally at the second server; and upon downloading the at least one of the one or more second segments from the second server, sending the at least one of the one or more second segments to the first client device.

3. The method of claim 1, wherein sending the request for the at least one of the one or more second segments that are not pre-stored locally at the first server to the second server further comprises:

sending a request for the second server to send the at least one of the one or more second segments directly to the first client device.

4. The method of claim 1, further comprising:

receiving a request from a third server of the network, distinct from the first server, for one or more third segments of a second compressible resource, the request specifying a second compression level for the one or more third segments of the second compressible resource;

identifying at least one of the one or more third segments pre-stored locally at the first server; and sending the at least one of the one or more third segments of the second compressible resource at the second compression level to the third server.

5. The method of claim 1, further comprising:

detecting a change of the network quality assessment score of the first client device; and changing the determined first compression level in accordance with the change of the network quality assessment score.

6. The method of claim 5, further comprising:

determining, for each remaining segment of the first compressible resource that is not yet downloaded to the first client device, whether the remaining segment is pre-stored locally at the changed first compression level;

in accordance with a determination that there is a previously sent request for the remaining segment at the first compression level, abandoning the previously sent request for said remaining segment at the first compression level;

in accordance with a determination that the remaining segment is pre-stored locally at the first server at the changed first compression level, sending the remaining segment at the changed compression level to the first client device; and in accordance with a determination that the remaining segment is not pre-stored locally at the changed first compression level, sending a request for said remaining segment at the changed first compression level to another server of the network.

7. A first server of increasing downloading speed in a network, wherein the first server is configured to communicate with one or more other servers of the network, including at least a second server that is distinct from the first server, and wherein the first server comprises:

one or more processors; and memory storing one or more programs for execution by the one or more processors, the one or more programs including instructions for:

receiving a download request from a first client device, the download request identifying a first compressible resource to be downloaded by the first client device;

obtaining a network quality assessment score of the first client device, the network quality assessment score indicating a projected download speed of the first client device, and wherein the network quality assessment score is calculated in accordance with an operator type of a network used by the first client device corresponding to the download request, a link type of a link layer protocol of the network used by the first client device, and a regional position where the first client device is located;

in accordance with the network quality assessment score, determining a first compression level of the first compressible resource for the first client device;

searching for the first compressible resource at the determined first compression level locally at the first server;

in accordance with a determination that one or more first segments of the first compressible resource at the first compression level are pre-stored locally at the first server:

sending the locally pre-stored first segments of the first compressible resource at the first compression level to the first client device; and in accordance with a determination that one or more second segments of the first compressible resource at the first compression level are not pre-stored locally at the first server:

sending a request for at least one of the one or more second segments that are not pre-stored locally at the first server to the second server of the network that is distinct from the first server, wherein the first server, before sending the request to the second server, queries the second server to determine that the at least one of the one or more second segments of the first compressible resource at the determined compression level that are not pre-stored locally at the first server is pre-stored locally at the second server.

8. The first server of claim 7, wherein the operations further comprise:

before sending the request for the at least one of the one or more second segments that are not pre-stored locally at the first server to the second server, querying the second server to determine that the at least one of the one or more second segments that are not pre-stored locally at the first server is pre-stored locally at the second server; and upon downloading the at least one of the one or more second segments from the second server, sending the at least one of the one or more second segments to the first client device.

9. The first server of claim 7, wherein sending the request for the at least one of the one or more second segments that are not pre-stored locally at the first server to the second server further comprises:

sending a request for the second server to send the at least one of the one or more second segments directly to the first client device.

10. The first server of claim 7, wherein the operations further comprise:

receiving a request from a third server of the network, distinct from the first server, for one or more third segments of a second compressible resource, the request specifying a second compression level for the one or more third segments of the second compressible resource;

identifying at least one of the one or more third segments pre-stored locally at the first server; and sending the at least one of the one or more third segments of the second compressible resource at the second compression level to the third server.

11. The first server of claim 7, wherein the operations further comprise:

detecting a change of the network quality assessment score of the first client device; and changing the first compression level in accordance with the change of the network quality assessment score.

12. The first server of claim 11, wherein the operations further comprise:

determining, for each remaining segment of the first compressible resource that is not yet downloaded to the first client device, whether the remaining segment is pre-stored locally at the changed first compression level;

in accordance with a determination that there is a previously sent request for the remaining segment at the first compression level, abandoning the previously sent request for said remaining segment at the first compression level;

in accordance with a determination that the remaining segment is pre-stored locally at the first server at the changed first compression level, sending the remaining segment at the changed compression level to the first client device; and in accordance with a determination that the remaining segment is not pre-stored locally at the changed first compression level, sending a request for said remaining segment at the changed first compression level to another server of the network.

13. A non-transitory computer readable storage medium having instructions stored thereon, wherein the instructions, when executed by one or more processors, cause the processors to perform operations comprising:

at a first server of a network, wherein the first server is configured to communicate with one or more other servers of the network, including at least a second server that is distinct from the first server:

receiving a download request from a first client device, the download request identifying a first compressible resource to be downloaded by the first client device;

obtaining a network quality assessment score of the first client device, the network quality assessment score indicating a projected download speed of the first client device, and wherein the network quality assessment score is calculated in accordance with an operator type of a network used by the first client device corresponding to the download request, a link type of a link layer protocol of the network used by the first client device, and a regional position where the first client device is located;

in accordance with the network quality assessment score, determining a first compression level of the first compressible resource for the first client device;

searching for the first compressible resource at the determined first compression level locally at a first server;

in accordance with a determination that one or more first segments of the first compressible resource at the first compression level are pre-stored locally at the first server:

sending the locally pre-stored first segments of the first compressible resource at the first compression level to the first client device; and in accordance with a determination that one or more second segments of the first compressible resource at the first compression level are not pre-stored locally at the first server:

sending a request for at least one of the one or more second segments that are not pre-stored locally at the first server to the second server of the network that is distinct from the first server, wherein the first server, before sending the request to the second server, queries the second server to determine that the at least one of the one or more second segments of the first compressible resource at the determined compression level that are not pre-stored locally at the first server is pre-stored locally at the second server.

14. The non-transitory computer readable storage medium of claim 13, wherein the operations further comprise:
before sending the request for the at least one of the one or more second segments that are not pre-stored locally at the first server to the second server, querying the second server to determine that the at least one of the one or more second segments that are not pre-stored locally at the first server is pre-stored locally at the second server; and
upon downloading the at least one of the one or more second segments from the second server, sending the at least one of the one or more second segments to the first client device.

15. The non-transitory computer readable storage medium of claim 13, wherein sending the request for the at least one of the one or more second segments that are not pre-stored locally at the first server to the second server further comprises:
sending a request for the second server to send the at least one of the one or more second segments directly to the first client device.

16. The non-transitory computer readable storage medium of claim 13, wherein the operations further comprise:
receiving a request from a third server of the network, distinct from the first server, for one or more third segments of a second compressible resource, the request specifying a second compression level for the one or more third segments of the second compressible resource;
identifying at least one of the one or more third segments pre-stored locally at the first server; and
sending the at least one of the one or more third segments of the second compressible resource at the second compression level to the third server.

17. The non-transitory computer readable storage medium of claim 13, wherein the operations further comprise:
detecting a change of the network quality assessment score of the first client device; and
changing the determined first compression level in accordance with the change of the network quality assessment score.

* * * * *